T. W. Fay,
Stump Extractor.
No. 95,011. Patented Sep. 21, 1869.
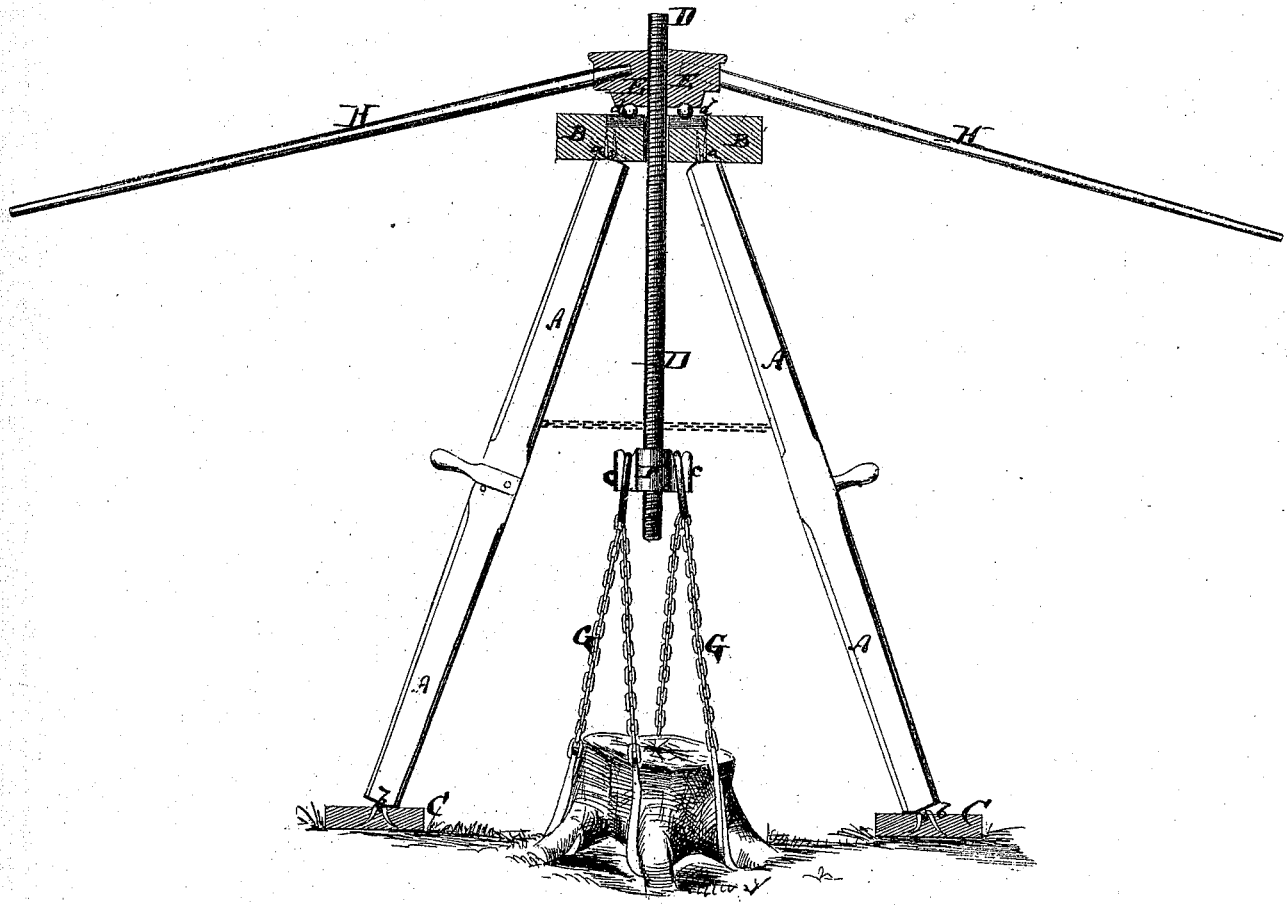
Witnesses:
Alex F. Roberts
Frank Blockley
Inventor:
T. W. Fay
per Munn & Co.
Attorneys.

United States Patent Office.

T. W. FAY, OF CAMDEN, NEW JERSEY.

Letters Patent No. 95,011, dated September 21, 1869.

IMPROVEMENT IN STUMP-EXTRACTORS.

The Schedule referred to in these Letters Patent and making part of the same.

*To all whom it may concern:*

Be it known that I, T. W. FAY, of Camden, in the county of Camden, and State of New Jersey, have invented a new and improved Stump-Extractor; and I do hereby declare that the following is a full, clear, and exact description thereof, which will enable others skilled in the art to make and use the same, reference being had to the accompanying drawings, forming part of this specification, in which the drawing represents a side view, partly in section, of my improved stump-extractor.

This invention relates to a new stump-extractor, or stone and log-lifter, of that class in which the power is applied to a screw-shaft by means of a nut.

The invention consists in a new manner of supporting the nut to avoid friction, and in a novel manner of fastening the supports to the main plate, and the shoes to the supports.

A A, in the drawing, are three or four legs, made of wood or metal, and fastened at their upper ends, by means of double eye-bolts, *a a*, to a plate, B. The upper ends of the supports A are partly bevelled, as shown, to fit well under the plate B.

To the lower end of each support A is, by means of double eye-bolts, *c c*, pivoted a shoe, C. The lower ends of A are also partly bevelled, as shown, to fit against the shoes. The shoes are, by the eye-bolt connections, so secured that they will adjust themselves to the form and nature of the ground.

D is a screw-shaft, fitted vertically through the plate B.

Above the plate B is fitted upon the screw a nut, E, which supports the screw.

Upon the lower end of the screw is fitted a nut or sleeve, F, which has hooks, *c c*, at the sides, to receive the drawing-chains G.

The nut rests on balls, *d d*, which are placed into a groove of the plate B.

The sides of the nut E have inclined mortises, for the reception of levers, H H, by which the nut is turned.

By having the mortises inclined, the levers will be in the same position to reach as low as required. The legs are, by cross-chains, prevented from spreading too far. The balls *d*, rolling under the nut, prevent much loss of power by friction.

Having thus described my invention,

I claim as new, and desire to secure by Letters Patent—

1. A machine, whose mode of operation is substantially as shown and described.

2. The combination with grappling-device and holder F, of a vertically-reciprocating and non-rotating screw D, and actuating, revolving nut E, all co-operating to lift the stump in a perpendicular line, and without rotation of the carrying-screw.

3. The combination of revolving nut E and recessed plate B of the friction-balls *d d*, freely moving around with said plate, for the purpose of producing rolling instead of sliding friction, thereby greatly lessening the resistance to be overcome by the power applied.

4. The combination with the legs A, shoes *c*, and plate B, of double eye-bolts affixed thereto, for the purpose of forming an expanding frame, which will accommodate itself to any unevenness of ground, in the manner set forth.

T. W. FAY.

Witnesses:
   CHAS. WATSON,
   G. W. LAUGHLIN.